United States Patent
Sharma et al.

(10) Patent No.: US 7,859,994 B2
(45) Date of Patent: *Dec. 28, 2010

(54) METHOD AND APPARATUS TO SWITCH DATA FLOWS USING PARALLEL SWITCH FABRICS

(75) Inventors: Vishal Sharma, San Jose, CA (US); Timothy Y. Chow, Quincy, MA (US); Charles E. Rohrs, Newton Centre, MA (US); Steven Dunstan, Beverly, MA (US); Joseph Cerra, Amherst, NH (US)

(73) Assignee: Tellabs Operations, Inc., Naperville, IL (US)

( * ) Notice: Subject to any disclaimer, the term of this patent is extended or adjusted under 35 U.S.C. 154(b) by 204 days.

This patent is subject to a terminal disclaimer.

(21) Appl. No.: 11/549,822

(22) Filed: Oct. 16, 2006

(65) Prior Publication Data

US 2007/0076736 A1    Apr. 5, 2007

Related U.S. Application Data

(63) Continuation of application No. 09/973,029, filed on Oct. 9, 2001, now Pat. No. 7,123,581.

(51) Int. Cl.
*G01R 31/08*    (2006.01)

(52) U.S. Cl. .................. 370/218; 370/216; 370/244

(58) Field of Classification Search ......... 370/216–228, 370/242–244, 250–251, 386
See application file for complete search history.

(56) References Cited

U.S. PATENT DOCUMENTS

| | | | |
|---|---|---|---|
| 4,737,951 A * | 4/1988 | Kruger et al. | ............... 370/217 |
| 5,303,232 A | 4/1994 | Proctor et al. | |
| 5,663,949 A | 9/1997 | Ishibashi et al. | |
| 5,802,054 A | 9/1998 | Bellenger | |
| 5,892,924 A | 4/1999 | Lyon et al. | |
| 6,046,999 A | 4/2000 | Miki et al. | |
| 6,842,422 B1 * | 1/2005 | Bianchini, Jr. | ............... 370/216 |
| 6,873,797 B2 * | 3/2005 | Chang et al. | ................... 398/51 |

(Continued)

OTHER PUBLICATIONS

Wolf; A Proposal for a High-Performance Active Hardware Architecture; WUCS-99-08; Feb. 15, 1999; pp. 1-16.

(Continued)

*Primary Examiner*—Phuc Tran
(74) *Attorney, Agent, or Firm*—Hamilton, Brook, Smith & Reynolds, P.C.

(57) ABSTRACT

A low-cost, high-speed data switching system and method uses several parallel switching systems or fabrics. In one of various embodiments, for example, the constituent data flows in a data stream can be selectively routed to a switching fabric that has the lowest input data rate. Data flows can be assigned to the various switching fabrics so as to balance the amount of data passing through each parallel system. Data flows can be re-assigned on an as-needed basis to insure maximum throughput. In the case where a data flow initially routed into one switching fabric must be re-routed to a different fabric, the ordering of data packets can be preserved by withholding the transfer of packets through the second fabric until the packets previously sent into the first fabric have cleared. Methods and apparatus of the present invention find application to parallel computing as well.

25 Claims, 5 Drawing Sheets

U.S. PATENT DOCUMENTS 7,123,581 B2 * 10/2006 Sharma et al. ............... 370/218
2002/0186654 A1 * 12/2002 Tornar ........................ 370/225

OTHER PUBLICATIONS

Parulkar, et al.; AITPM: a Strategy for Integrating IP with ATM; ACM 0-89791-711; 1995; pp. 49-58.

Braden, et al.; Integrated Services in the Internet Architecture: an Overview; RFC1633; Jun. 1994; pp. 1-34.

Bux, Werner et al.; Technologies and Building Blocks for Fast Packet Fowarding; Telecommunications Neworking at the Start of the 21st Century; IEEE Communications Magazine; pp. 70-77; Jan. 2001.

* cited by examiner

METHOD AND APPARATUS TO SWITCH DATA FLOWS USING PARALLEL SWITCH FABRICS

CROSS REFERENCE TO RELATED APPLICATIONS

This application is a continuation application of U.S. application Ser. No. 09/973,029 filed Oct. 9, 2001 and now U.S. Pat. No. 7,123,581 which is hereby incorporated herein by reference.

TECHNICAL FIELD OF THE INVENTION

The present invention relates in general to communication signal processing and more particularly to a method and apparatus for switching flows among a plurality of switching pathways.

BACKGROUND OF THE INVENTION

The Internet and its ever-increasing use, by a rapidly growing number of users, has created ever-increasing demands on data networks that carry everything from Internet e-mail messages to web pages to even voice traffic. The data networks that comprise the Internet are required to carry greater amounts of data, faster and faster. As a result, the data switches from which the networks are assembled are becoming increasingly complex and expensive.

Internet protocol (IP) data networks now routinely carry data at rates that are well over 1 gigabit per second. Switching equipment that is fast enough to handle such data needs to be able to decode, among other things, address information embedded within an IP data packet and then re-route packets to the appropriate destination. In managing the growth of data networks that carry high-speed data, a switching system that is able to switch high-speed data at relatively low cost would provide a significant advantage to network service providers, in part, by providing them with the equipment to maintain service levels albeit at a relatively low cost.

SUMMARY OF THE INVENTION

From the foregoing, it may be appreciated by those skilled in the art that a need has arisen for a technique to effectively route packets in a communication network. In accordance with the present invention, a method and system for routing packets are provided that substantially eliminate or greatly reduce disadvantages and problems associated with conventional packet routing techniques.

According to an example embodiment of the present invention, there is provided a method for routing packets that includes receiving a stream of packets and identifying at least one flow in the stream of packets. The flow is assigned to at least a first one of a plurality of switching pathways and the packets of the flow are routed over the first one of the plurality of switching pathways. A condition is identified during the routing of the packets of the flow. At least a portion of the flow is assigned to a second one of the plurality of switching pathways in response to the condition and the packets of the portion of the flow are routed over the second one of the plurality of switching pathways.

The present invention provides various technical advantages over conventional packet routing techniques. Some of these technical advantages are shown and described in the description of the present invention. Certain embodiments of the present invention may enjoy some, all, or none of these advantages. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
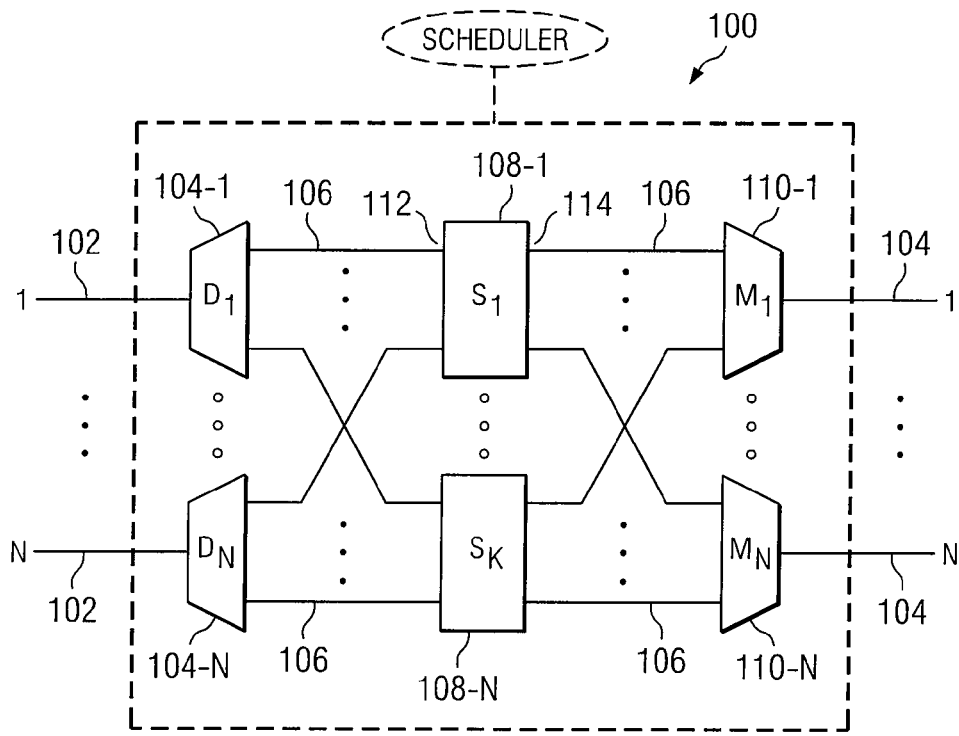
FIG. 1 shows a simplified representation of a high-speed switch implemented using several parallel switching systems.

FIG. 1 shows a simplified block diagram of a low-cost, high-speed internet protocol (IP) switching system 100 that accepts at an input port 102, a relatively high-speed stream S of IP data packets (not shown) at a first data rate R. The switch 100 routes the IP packets presented at the input ports 102 to different output ports 104, which are coupled to transmission media (not shown) leading to other switching systems (not shown) by using several lower-speed switching systems that switch data presented to them at a second rate.

A low-cost, high-speed IP data switch can be realized using the architecture of the switching system 100 shown in FIG. 1 by first "splitting" the incoming high-speed streams S into several lower-speed streams $S_1$-$S_N$ 106 the average rate of which is substantially equal to R/N, where N is the number of lower streams into which the high speed stream S is split. Because the split streams $S_1$-$S_N$ 106 are effectively at a much lower data rate than the stream S, the IP packets of the split streams $S_1$-$S_N$ can be switched (routed) by lower-speed switching systems—if each of the switch fabrics is appropriately set up and if the packet order of the incoming IP data streams that comprise S can be preserved through the switch 100.

"Splitting" several different incoming IP data streams (which when combined are the bulk stream S) into N, ostensibly slower, "sub-streams" $S_1$-$S_N$, is effectively accomplished by way of data demultiplexors 104-1-104-N, in combination with data buffers. By appropriately controlling the demultiplexors 104-1-104-N, by way of control signals (not shown) that are input to the demultiplexors 104-1-104-N, they can be made to send temporal segments of the stream S to different buffers.

In general, demultiplexing is well known to those skilled in digital electronic arts. Similarly, counters and their use as divide-by-N circuits are also well know to those skilled in digital electronic arts. Inasmuch as the relatively low speed switching systems used in the method and apparatus disclosed herein have a "speed limit" above which they cannot switch data, the data that is input to these switches from the buffers is clocked into these parallel-operated switching systems (from their corresponding buffers) at a rate at which the switches can accept and route the data. Inasmuch as the data that is written into the buffers is at a much higher rate, albeit in only a burst thereof, the buffer acts to accept such bursty data and smooth out its delivery rate into the fabrics making the bursty nature at which the data is written into the buffers transparent to the actual switches. Stated alternatively, by reading data out of the buffers at a relatively smooth rate below the rate at which the data was written in (at a higher rate) the buffer acts to divide down the rate at which a substream was written into the buffer without actually performing a true division of the substream. A burst of data is clocked into the buffer at a first, high rate. The same data is then clocked out of the buffer at a second lower rate (typically smooth) at which the associated fabric can accept it.

In FIG. 1, there are N separate 1-x-k input demultiplexors, each of which takes in a high-speed stream S and, under the control of an external circuit or processor, routes segments of the data stream S into at least 1 of the k different output terminals of each demultiplexor. For N=4, each demultiplexor 104-1-104-4 can route data of its corresponding input stream S, to one of four different, albeit parallel switch fabrics 108-1-108-4, depending upon the control signals that are input to the demultiplexor. Correspondingly, each of the four (4) switching fabrics 108-1-108-4 has four (4) outputs, such that one output of each fabric is coupled to one of the four (4) inputs of the multiplexors 110-1-110-4 to re-create one or more high-speed output streams of IP packets 104 that are carried toward an appropriate destination of each IP flow switched through the system 100. Those skilled in the art will appreciate that alternate embodiments of the invention would include using virtually any combination of switch fabric input ports or terminals and switching fabric output ports or terminals without departing from the inventive concept disclosed herein. Similarly, different sized multiplexors could also be used without departing from the scope of the subject matter claimed in the appended claims. By way of example, a switch fabric 108 might have 4, 7, 9 or 32 different inputs and have 3, 5, 7, 9 or 52 outputs.

Those skilled in the art will also recognize that the switching fabrics used in the apparatus disclosed herein will be subject to their physical limitations. A switch fabric must have at least one output from which switched data packets emerge to be routed elsewhere.

Packets that are routed through the switch 100 might need to pass through several other switches and networks before they end up at the computer of an Internet user. Network topology is beyond the scope of this disclosure and not required to understand the disclosure herein.

By appropriately configuring the parallel fabrics 108-1-108-N to route IP packets (that are received at their corresponding input ports 112) to the appropriate output ports 114 of the fabrics 108-1-108-N; several low speed fabrics that are properly operated in parallel can accomplish what a single, albeit more costly, high-speed fabric might achieve.

Splitting a stream into pieces or flows or segments and switching the split streams separately and then re-combining several lower speed streams into one or more higher-speed output stream is not trivial however. If the streams are improperly combined at the output side of the switch,—out-of-order packets in those streams can be very disruptive for an IP flow when it reaches its destination (triggering a retransmission of an entire data exchange) if the packets of a flow are not re-assembled in their correct order.

By definition, IP packets include a source address and a destination address which identify respectively, where the packets are from as well as where the packets are supposed to be sent. IP packets are also sent in a temporal order with respect to each other. Mis-ordering a string of IP packets will almost always require that an entire IP message be resent from the source, needlessly overloading the data networks over which the message is carried. Preserving the IP packet order through a switching system that uses several parallel switches is important. The method and apparatus disclosed herein enables IP packets of a high-speed stream S to be split into sub-streams, each of which is routed to a switch fabric that is set up to route the flows embedded in the sub stream it carries, to an appropriate output port 114. The sub-streams, as well as temporal portions thereof, are routed to several different CFEs and switch fabrics, in such a way as to minimize, at an output port of the overall switch, the re-ordering of packets of a flow that arrive on different sub-streams, and to minimize any buffer overflow at the input ports of the system.

In general, IP packets are characterized by a header block of information followed by an indeterminate (variable) number of data bytes. The header includes a source address denoting the logical location or identity of the computer from which the packets originated. The header also includes a destination address that identifies the destination computer for the packets. Maintaining the proper order of packets through a switch might be more fully appreciated by reference to FIG. 2, which shows additional details of the implementation of a low-cost, high-speed IP data switching system.

Figure 2:
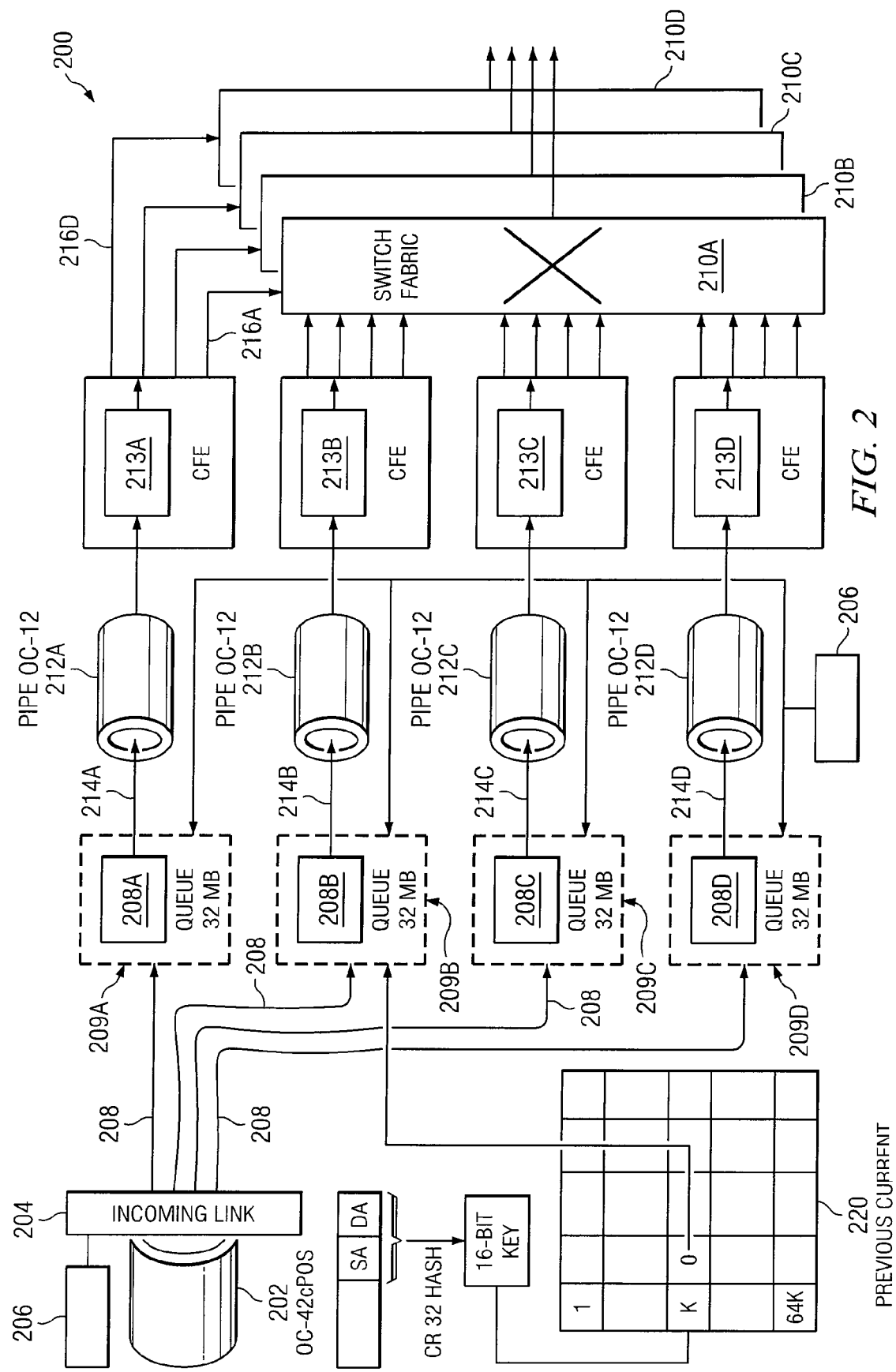
FIG. 2 shows a more detailed depiction of the functional elements of a switching system comprised of several parallel switches.

With respect to FIG. 2, incoming data arrives at the switch 200 at a relatively high rate (a "first" rate) via a fiber optic cable, coaxial cable, or other transmission media 202. The incoming data stream S is comprised of perhaps hundreds of different IP flows, each of which is comprised of IP data packets. Each IP packet nominally has a source address and a destination address. IP data packets that have the same source address and the same destination address are considered herein to be a "data flow" or an "IP data flow" in that the packets represent related data. For purposes of claim construction therefore, a "data flow" as well as an "IP flow" or an "IP data flow" can include (but is not limited to): data required to paint a web page onto the screen of a PC logging onto a web site; data comprising an MP3 music file; an e-mail message as well as documents or other files attached to an e-mail message; data representing voice signals, all subject to the condition that packets that share a common source and destination are "IP flows", A demultiplexor 204, which operates under the control of a switch controller 206, effectively routes segments (or pieces) of an incoming stream into one of four data buffers or data queues 208A-208D. The controller 206 therefore effectively "assigns" an IP data flow or its constituent packets to one of the data buffers. In the preferred embodiment, the data buffers 208(A-D) were implemented as 32 Mbyte, dual-port (separate input and output ports) first-in/first out (FIFO) buffers whereby data from the demultiplexor can be written into the buffers through an input or terminal 209A-209D yet read out of the buffers' outputs 214A-214D.

Static or dynamic semiconductor random access memory functions well as a buffer 208. Alternate embodiments might include using a variety of memory devices, including perhaps even magnetic disk storage.

The data rate into the buffers does not need to be the same as the data rate out of the buffers. As such, each buffer 208A-208D continuously transfers data into its corresponding switch fabric 210A-210D through a corresponding data pipe 212A-212D that couples the data buffers' outputs 214A-

214D to the respective inputs 216A-216D of the switch fabrics 210A-210D. Alternate embodiments of the preferred embodiment however would include buffers 208A-208D that might have a few as one byte of storage. For purposes of claim construction, a data buffer (208A-208D) (also referred to as a data queue), any sort of interconnecting data path between a buffer and a corresponding/associated switch fabric 210A-210D, and any intervening circuitry or processing is considered to be a "switching path" into which data, data packets, or data flows are directed, routed, carried, or transferred. "Switching path," "pipe," "data pipe," and "IP pathway" are used interchangeably hereinafter.

Having described the structure of a low-cost, high-speed switching system, the control of the IP packets as described hereinafter determines, in large part, the viability of a low-cost, high-speed switching system implemented using several parallel switching fabrics and in particular whether the split streams $S_1$-$S_N$ can be reassembled at the output of the switch fabrics 210A-210D substantially in the proper order.

Inasmuch as the various IP data flows, $f_1$-$f_n$, arriving at the switch 200, have different destinations to which they each must be sent (or routed), it is the function of the switch 100 (of FIG. 1) to route the incoming IP flows that arrive at the input port to one or more different output ports. Each output port is typically coupled to a different data transmission media that eventually extends to the destination of each packet. Controlling the order in which packets are delivered to the parallel switching fabrics is important to the operability of the switch.

One way of initially assigning data packets to the various pathways (a data buffer and its associated switching fabric) through the switch 200 of FIG. 2 is a simple round-robin scheme, of which there may be many variations. A round-robin scheduling method would essentially have the demultiplexor 204 send IP data flow (or flows) into one buffer (208A-208D) until the occurrence of some detectable event or condition. Upon the detection or occurrence of such an appropriate event, some of which are discussed hereinafter, the demultiplexor would direct subsequent IP data from the stream S to a second (i.e. different) data buffer or queue.

While a round-robin scheduling method can work in theory, and for claim construction purposes is considered to be one way of assigning an IP flow to a pathway through the switch 200, in practice a round-robin scheme is not the best method because it is not likely to yield correct packet ordering at the output of the fabrics. This is because packets that travel to a given output via independent paths through separate pathways through the switch 200 CFEs may experience different delays. Each pathway through the switch 200 includes a buffer (208A-208D), a transmission line or other circuit coupling the output of the buffers (208A-208D) to a cell forwarding engine or "CFE" which examines the packet header to decide the output of the associated switch fabric to which the packet must be sent. If the differential delay across any two pathways is sufficiently different, it is possible for two packets that were launched down successive pathways (also referred to herein as pipes or data pipelines) to arrive out of order at the output terminal of the switch fabrics 210A-210D. It is also possible that a particular IP flow might be made up of several long IP packets that are sent down one pipe followed by only one or two very short IP packets that are not followed by any other data packets. In such an event, the series of long IP packets sent down the first pipe (208D, 212D, 210D for example) would not traverse the switching fabric into which they were sent as fast as the one or two short IP packets sent down another pipe would traverse the switching fabric into which they would be sent (208A, 212A, 210A for example). As a result, the short packets could overtake the long packets and arrive at the output of the stream before the long packets.

In the preferred embodiment, an IP packet mapping scheme preferably makes an initial determination to assign packets of IP flows $f_1$-$f_n$ (which are integrated amongst all IP flows carried on the incoming link 202 and which can be re-directed by the demultiplexor 204) to pipes without knowing the rate of the flow through a particular pipe. This is important because it is possible for a given pipe to be assigned an IP flow such that the sum of the IP packet rates of the existing flows $f_1$-$f_n$ on the pipe plus the rate of the new flow exceeds the drain rate of the pipe, which is established by the through rate of the switching fabric serving the pipe. If this condition persists for a sustained length of time, it becomes necessary to prevent buffer overflow by switching some IP flows from one pipe to another and lowering the incoming rate into the first pipe below its drain rate (into its switch fabric). Because a mapping scheme that does not, a priori, know the rates of the incoming flows $f_1$-$f_n$ is susceptible to both buffer overflow (when a pipe consistently receives traffic at a rate exceeding its drain rate) and packet mis-ordering (when imminent buffer overflow forces flows to be switched from one pipe to another), an objective of an optimum mapping scheme is to map the incoming IP flows $f_1$-$f_n$ to the pipes in a manner that minimizes the dropping and mis-ordering of packets.

In the preferred embodiment shown in FIG. 2, upon the arrival of an IP packet of an IP flow, the controller 206, or some other intelligent circuit, calculates a hash key from the IP source and destination address fields. The calculated hash key is used as an index into a table 220, the other contents of which are used to identify the particular buffer into which the IP packet is to be sent, the time that the packet was sent into the buffer, as well as the amount of data brought in by that packet. In the preferred embodiment, the hash key was calculated to 16 bits. Accordingly, such a hash key could index up to 64 thousand table entries. The hash key indexes an entry in an internal IP-flow table 220, each entry of which identifies an IP flow (a series of IP packets having the same source and destination addresses) into the switch 200 by the calculated hash key. The table 220 contains a timestamp field, to mark the time of arrival of the last packet of an internal flow and a CFE port, to identify the OC-12 pipe that this internal flow is currently assigned to (if any). If the internal flow that the packet hashes to already exists, the incoming packet is placed in the data queue associated with the pipe that feeds the CFE specified in the CFE port field and the timestamp for the flow is updated. Otherwise, the timestamp field is initialized and the internal flow is assigned to a CFE port using the flow assignment procedure.

An internal pipe (comprised of a buffer 208A-D, a data path or transmission line 212A-D, a CFE 213A-D, and a switch fabric 210A-D) will become "overbooked" when its data input rate exceeds its data drain rate. Accordingly, this necessitates IP flow and/or IP packet transfers from overused pipes to underused ones. It also requires that in general, new flows be assigned to the least burdened pipe. In order to prevent or minimize packet mis-ordering at the output of the switch fabrics 210A-210D, an internal flow (a flow for which a hash key has been calculated and which has been assigned a particular pipe) should be reassigned to a different pipe when one or more predetermined conditions either necessitate or suggest the re-routing of data packets to another pipe. In such an event, packet transmission down a second pipe is retarded until the packets sent into or down the first pipe (for switching by the first switch fabric) have cleared the corresponding buffer 208A-208D, the transmission path 212A-212D linking the buffer to a CFE 213A-213D and have been input to the fabric 210A-210D. Otherwise, it is possible for a packet previously launched down a first pipe from the demultiplexor 204 to be overtaken by a different packet of the same flow launched down a different pipe at a later time.

In a preferred embodiment, the launch of an IP packet of a flow that was transferred to a second pipe is delayed by an estimate of the amount of time required for the packets previously launched down a first pipe to clear the front end of the switch, which elements include: the buffer (208A-D), the transmission line 212A-D, and the CFE 213A-D. This time is referred to herein as the input system clearing time $T_c$. In instances where a switch fabric 210A-D includes any sort of input buffering or output buffering, the input system clearing time would need to accommodate such other sources of delay. In a preferred embodiment, once an IP data packet reaches a switch fabric, it is queued based only on its output destination address. Therefore, data sent along different paths, but intended for the same output destination, is queued within similar queues at the output ports of the fabrics, or in some embodiments, possibly within the fabrics themselves. Thus, if we can ensure that the packets maintain their order as they enter the fabrics, they should remain in order from that point on.

The flow assignment methodology is blind to the rate of a new internal flow, in part, because at the instant that an initial association between a new internal flow is made, there is no knowledge of even the existence of subsequent packets. Inasmuch as the switch 200 has only received the first packet of that flow, and, therefore, does not have enough information to deduce or estimate the rate of the flow, initial flow assignments should not be made on the basis of any expected data volume or data rate. It should be noted however that even though the preferred methodology cannot estimate the new flow rate, the aggregate rate at which data flows into each of the four pipes can be determined and recorded in the table 220. Historical information about flows into a pipeline can be used to decide when any of the existing flows—or new flows—should be moved from one pipe to another, which flows should be moved, and which pipe they should be moved to.

Figure 3:
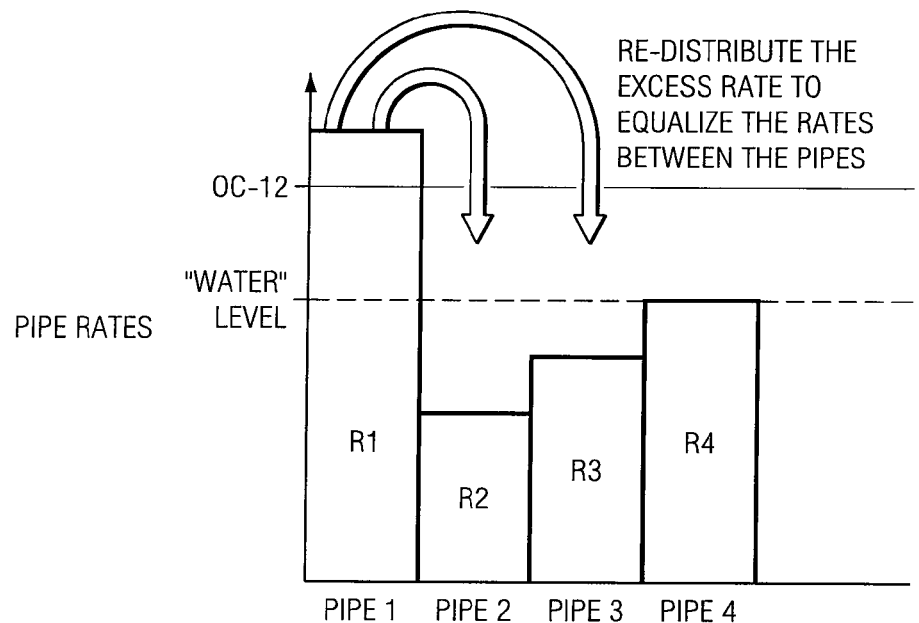
FIG. 3 depicts a flow balance issue in a switch having several parallel data flow "pipes"

FIG. 3 illustrates the usefulness of pipe data rate information. The flow assignment methodology of the preferred embodiment, which is disclosed hereinafter, attempts to mimic a "water-leveling" algorithm. Stated alternatively, the method of achieving a high-speed through-put seeks to balance the data rate that is distributed to the various pathways through the several low-speed switching fabrics which, in combination, are seeking to replicate the functionality of a single, faster switch.

In general, a new flow is assigned to the pipe (i.e. a buffer 208A-208D and the circuitry following it) with the lowest aggregate input rate at the time that the new IP flow arrives. In general, the assignment procedure will also move a flow when the aggregate input rate into a pipe exceeds its drain rate. Thus the aggregate flow rates can also be used to decide which pipe to move a flow or flows based upon the lowest current aggregate input rate into the various pipes as well as how much data (i.e. how many different flows $f_1$-$f_n$) to move. Note that aggregate IP flow rate information does not enable the exact identification of which flows must be moved to effect a desired equalization of data rates between the pipes. In order to identify exactly the particular flows that need to be moved so as to effect a particular equalization, it is necessary to maintain a data base of the average rates feeding the various pipes. Once the total rate $\Delta R$ to be moved from one pipe to another is known so as to equalize all of the flow rates, it is possible to pick exactly the flow or flows $f_1$-$f_n$ from the first pipe the sum of those whose data rates is equal to $\Delta R$.

One way to obtain an estimate of an internal flow's rate is by having the controller 206 or other appropriate device calculate the IP flow rates through the various pipes over time. Inasmuch as an IP flow might change its rate instantaneously, it might be necessary to repeatedly calculate an IP flow's rate repetitively. Once the calculation is made at least once, the resultant value can be stored using an additional field or fields in the internal IP flow table 220 shown in FIG. 2. In a preferred embodiment, it is preferred to obtain an average rate for each flow over some time period T referred to as an estimation interval.

The estimation interval data rate calculation is done by recording the amount of traffic $B_i$ (wherein the traffic might be in units of data bytes, binary digits or bits, IP packets, IP packet lengths, or a combination of all of some such parameters) from each flow i that came in during an interval T and, at the end of that interval, computing the flow's average rate $B_1/T$. One way that this can be accomplished is by reading the size of each packet of a flow from its IP header block upon the packet's arrival at the switch 200 and adding that value to a running total of the amount of data (in bytes, say) brought in by the same IP flow since the beginning of the most recent estimation interval. By choosing T to be a multiple of two, the average rate calculation could be simplified to a simple bit-shift of the total traffic $B_1$. Alternatively, all IP flow rates can be normalized by T a priori, so that no division is needed. The average rate from the previous estimation interval is stored and used as an estimate of the flow's rate for reassignments that need to be made during an ongoing estimation interval. More sophisticated rate estimators, such as the Time Sliding Window (TSW) estimator of Clark and Fang, ("Explicit allocation of best-effort packet delivery service," IEEE/ACM Trans. on Networking, vol. 6, no. 4, August 1998, pp. 362-373, the teachings of which are incorporated herein by reference) or an IIR-filter based moving average estimator could also be used. At least one problem with IIR estimators, however, is that they update their estimate of the rate upon the arrival of each packet, which could be computationally expensive necessitating an overly expensive controller 206 or other processor.

Figure 4:
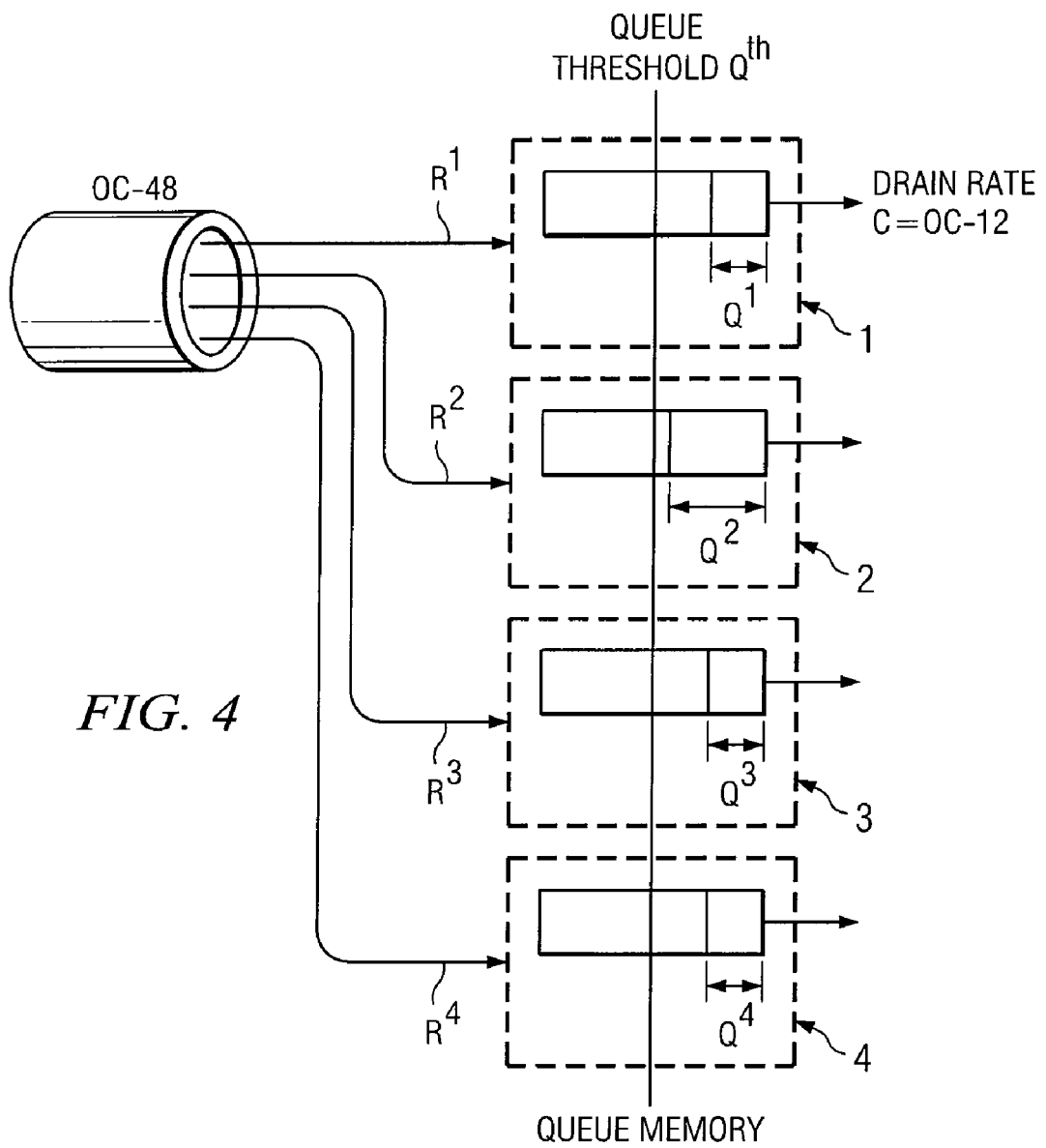
FIG. 4 depicts how different IP flows might be queued in different data pipes.

The preferred embodiment of the method for obtaining a high-speed switching system using several, parallel-fed low-speed switching fabrics has two different phases: an initial assignment phase that is executed upon the arrival of the first packet of a new internal flow and a flow adjustment phase that is executed upon detecting actual or threatened congestion, as well as periodically adjusting flows $f_1$-$f_n$ to re-balancing rates across the pipes. FIG. 4 depicts a simplified representation of how the switch 200 and its associated controller 206 initially assigns a data flow to a pipe.

A new flow i, is initially assigned to a pipe j for which the aggregate data rate $R^j$ through the pipe j is the smallest. In FIG. 4, if the data rate into buffer 4 is the smallest of the data rates into all four buffers, then a new IP flow needing to be assigned to a pipe would be assigned to pipe 4 with the data packets for that flow being routed to buffer 4. In the instance where two or more pipes $i_1$ and $i_2$ carry equal amounts of data that is the smallest of all other pipes, i.e. a "tie," the new flow should be assigned to the pipe with the smaller queue length $Q^1$ or, if needed, via a round-robin selection scheme. With respect to FIG. 4, if buffers 3 and 4 had equal amounts of data stored in them, a round robin assignment scheme would assign a new flow to either buffer 3 or 4 depending upon a variety of factors.

Once an IP flow is assigned to a pipe, the demultiplexor 204 physically routes that particular IP flow or flows to the corresponding data buffer 208A-208D by directing the data stream S to the buffer until such time as the multiplexor directs that flow to some other buffer for another pipe. The re-direction of a flow to another pipe occurs when one or more conditions are detected or determined to have occurred. The "conditions" that trigger IP flow(s) redirection occur after a flow is initially assigned to a particular pipe.

In the course of assigning flows and then routing flows to a pipe, the preferred embodiment contemplates one "condition" as simply re-distributing, i.e. moving flows between pipes so as to balance or equalize the data rates of all pipes in the switch 200. The decision to move flows $f_1$-$f_n$ between pipes may also be based on congestion, which can be defined a variety of ways.

Figure 5A:
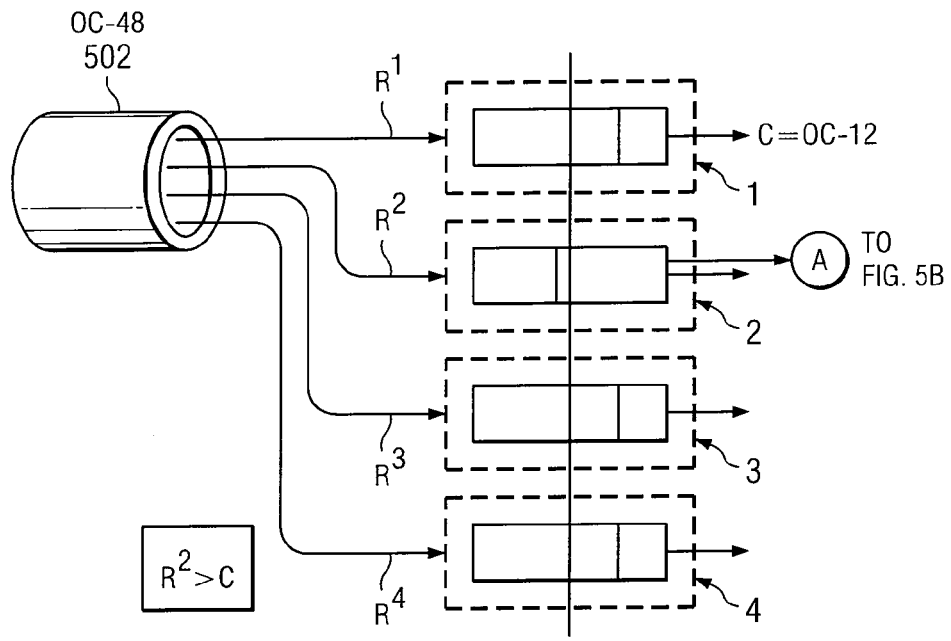
FIGS. 5A and 5B show how one or more IP flows might be re-directed to balance or smooth data flows across different data pipes.
Figure 5B:
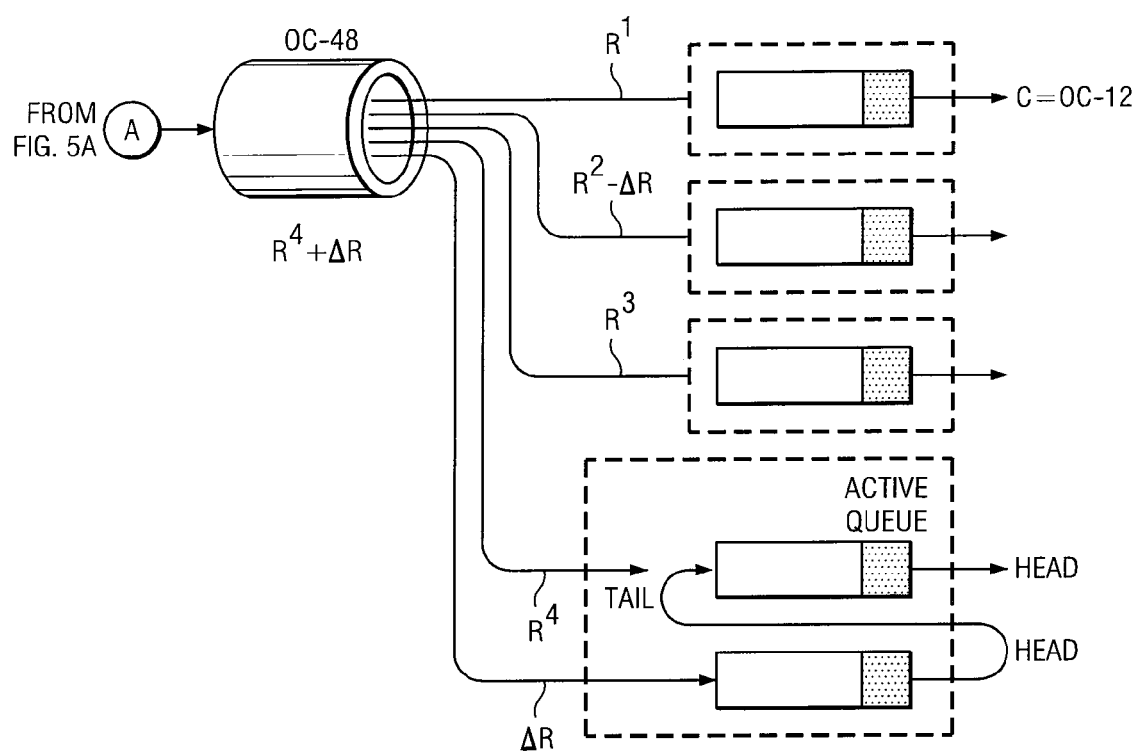

FIGS. 5A and 5B depict the re-direction of IP data flow from one pipe to another because of the congestion of a pipe.

In FIG. 5A there is shown a simplified representation of a transmission media 502 that operates at some known nominal data rate. Four different data flows $R^1$ $R^2$ $R^3$ and $R^4$ are represented schematically as being distributed to four different data buffers 1, 2, 3 and 4. Each data buffer has a predetermined number of data bytes that it can store for later retrieval. As shown in the figure, a threshold $Q^{th}$ demarcates a maximum occupancy of the buffers above which buffer overrun is possible if an incoming data rate exceeds the buffer's data drain rate.

When the volume of data stored in buffer no. 2 exceeds the threshold $Q^{th}$, some of the data routed into buffer 2 should be redirected to another buffer, i.e. another pipe. As shown in FIG. 5B, buffer 4 has the smallest amount of data stored in it. If some of the data from the second pipe (feeding buffer 2) could be routed to the fourth pipe (feeding buffer 4) the overall loading of each of the pipes could be equalized but more importantly, an overrun of buffer 2 might be avoided.

As shown in FIG. 5B, an amount of data ΔR is moved from pipe 2 and added to the data routed into pipe 4. The data rate ΔR that is re-directed into buffer 4 initially avoids a data overrun in buffer 2. In order to avoid mis-ordering IP data packets of the flow or flows that were re-directed to buffer 4 however, the ΔR of data flows directed to buffer 4 must be temporarily delayed or queued in buffer 4 for a sufficient length of time to allow the portion of the flows originally sent to buffer 2 to clear buffer 2 and at least get to its corresponding switch fabric. The length of time required to assure that flows re-directed to buffer 4 will not overtake the packets in buffer 2 is substantially equal to the system clearing time $T_c$ multiplied by the volume of data (e.g. number of bytes) redirected into buffer 4.

One event or condition triggering a flow redirection is when congestion in the pipe is determined to have occurred and when the amount of available space in the associated buffer is below a predetermined amount. For a preferred embodiment of the invention, data re-direction to another pipe is considered to be required when for some pipe j of a plurality of pipes according to the expression:

$$\sum_{i \in flows\ in\ pipe\ j} r_i^j = R^j \geq C \text{ and } Q^j \geq Q^{th}.$$

That is, when the aggregate data rate $R^j$ of all of the IP flows denominated as $f_1$ to $f_n$ into a pipe j exceeds the pipe's drain rate C (where "drain rate" is the rate at which data is read from a data buffer 208A-208D into a corresponding switch matrix 210A-210D) and the occupancy of the associated data buffer (data buffer occupancy, which is considered herein to be the portion, size, amount or the number of bytes of a buffer filled or occupied with data waiting for transmission into a switch fabric) for the pipe j exceeds a predefined threshold. As long as the amount of data in the buffer fluctuates within or below a threshold however, no congestion condition is declared. This dual-condition congestion determination absorbs periodic fluctuations in the rates of the IP flows, which by their very nature are aperiodic and bursty, and attempts to minimize the frequency of unnecessary flow movement from one pipe to another.

Another condition (of an alternate embodiment) that might be used to trigger flow re-direction from one pipe to another includes the instance when the data rate of just one data flow $f_1$ of all of the data flows $f_1$-$f_n$ into a data buffer exceeds the rate at which data leaves the same buffer through its associated switch fabric and as before, the amount of data stored in the first data buffer exceeds a predetermined threshold.

Another condition (of an alternate embodiment) that might be used to trigger IP flow re-direction from one pipe to another includes simply the instance when the data rate of one IP data flow $f_1$, or perhaps a few IP flows, exceeds a predetermined rate. If, for example, it is known that data stored in a buffer of a pipe is being "drained" from a buffer (by the associated switch matrix) at a relatively fixed rate, a maximum sustainable input rate, which might be determined empirically, algorithmically, or otherwise, might be used to determine that whenever data is input at such a maximum rate, buffer overrun is inevitable and an IP flow re-direction is required.

Another condition (of an alternate embodiment) that might be used to trigger IP flow re-direction from one pipe to another includes instances when the aggregate data rate of all of the IP flows $f_1$ to $f_n$ into the first data buffer exceeds the data rate of the IP flows $f_1$ to $f_n$ leaving the buffer.

If for some reason, a switch fabric slows or the data drain rate from a buffer is low or drops, another condition (of an alternate embodiment) that might be used to trigger IP flow re-direction from one pipe to another includes instances when the rate of data of at least one IP flow $f_1$ routed into the first data buffer exceeds the rate of data leaving the first buffer.

Yet another condition (of an alternate embodiment) that might be used to trigger flow re-direction from one pipe to another includes instances when an IP data packet format error is detected, such as a missing or incorrect source or destination address, an incorrect byte count, or a checksum/CRC error. In instances where in incoming IP packet has been corrupted, an alternate embodiment of the invention would include directing an invalid packet or an invalid flow to a special pipe for other processing or routing.

Still other embodiments might re-direct IP data flows simply when the amount of data stored in said data buffer exceeds a predetermined threshold. A buffer failure, such as a stuck address or data bit might also trigger the re-direction of IP flows around a defective component. Similarly, when a switch fabric fails or is otherwise partially or completely inoperative, IP flows should be directed to other fabrics, possibly including a redundant fabric especially allocated to fault recovery.

Insofar as IP flows in one pipe might tend to overrun the pipe's ability to transfer data, in a preferred embodiment IP flows may be transferred across pipes either periodically (in an attempt to keep the aggregate rates into the four pipes as close to each other as possible) or when the difference between the rates of flows into any two pipes exceeds a given configurable threshold (that is, when the flow rates become imbalanced).

The flow transfer phase of the algorithm decides which flows should be moved. The algorithm preferably moves only those flows whose movement is required to equalize the average IP packet data rates on all of the pipes. There are however, two practical difficulties in executing this.

One problem in moving one or more flows to equalize the data rates through all of the pipes is that an exact re-distribution of flows across pipes may require moving flows from more than one pipe to more than one pipe. In fact, performing such a re-distribution optimally may involve solving a combinatorial problem akin to bin packing, which may be difficult to do. For purposes of claim construction however, IP flow re-direction to adjust or balance IP flows across all pipes is considered to include IP flow movement to achieve exactly equal distribution of data through the various pipes.

A second problem in moving flows to equalize the data rates through all pipes is that even if an exact distribution could be calculated, it would still be necessary to parse the entire internal IP flow table 220 to identify the flows that have data rates the movement of which might achieve an exactly even distribution. Parsing the entire table would be a computationally intensive effort, somewhat needlessly adding to processor overhead and cost.

Regardless of the condition (or event) that precipitates (or initiates) an IP flow transfer from one pipe to another, a preferred method to shift flows between pipes first tries to move flows only between a pair of pipes, and in particular from the pipe with the maximum rate to the one with the minimum rate. For example, if two pipes in question are pipes l and m respectively, carry data at rates $R^l$ and $R^m$ respectively, data flows with a cumulative rate equal to $(R^l-R^m)/2$ can be transferred from pipe l to pipe m. In an alternate embodiment, for instance, if $R^l \geq OC-12$, an IP data flow may be transferred so as to just reduce $R^l$ to a certain percentage below the pipe's drain rate.

To effect a transfer of a flow of a rate equal to $(R^l-R^m)/2$ between pipes l and m as set forth above (to balance flows across all pipes) there might also be established flows that may also have to be moved between the pipes. Stated alternatively, to move a particularly problematic flow might require the movement of other flows in order to accommodate the movement of the problematic flow. Since the packets of an IP flow arrive randomly, a first method of deciding whether a particular flow should be transferred includes establishing a rate threshold and thereafter transferring the flow only if its rate exceeds a threshold rate equal to some fraction of the total rate that is to be transferred.

Figure 6:
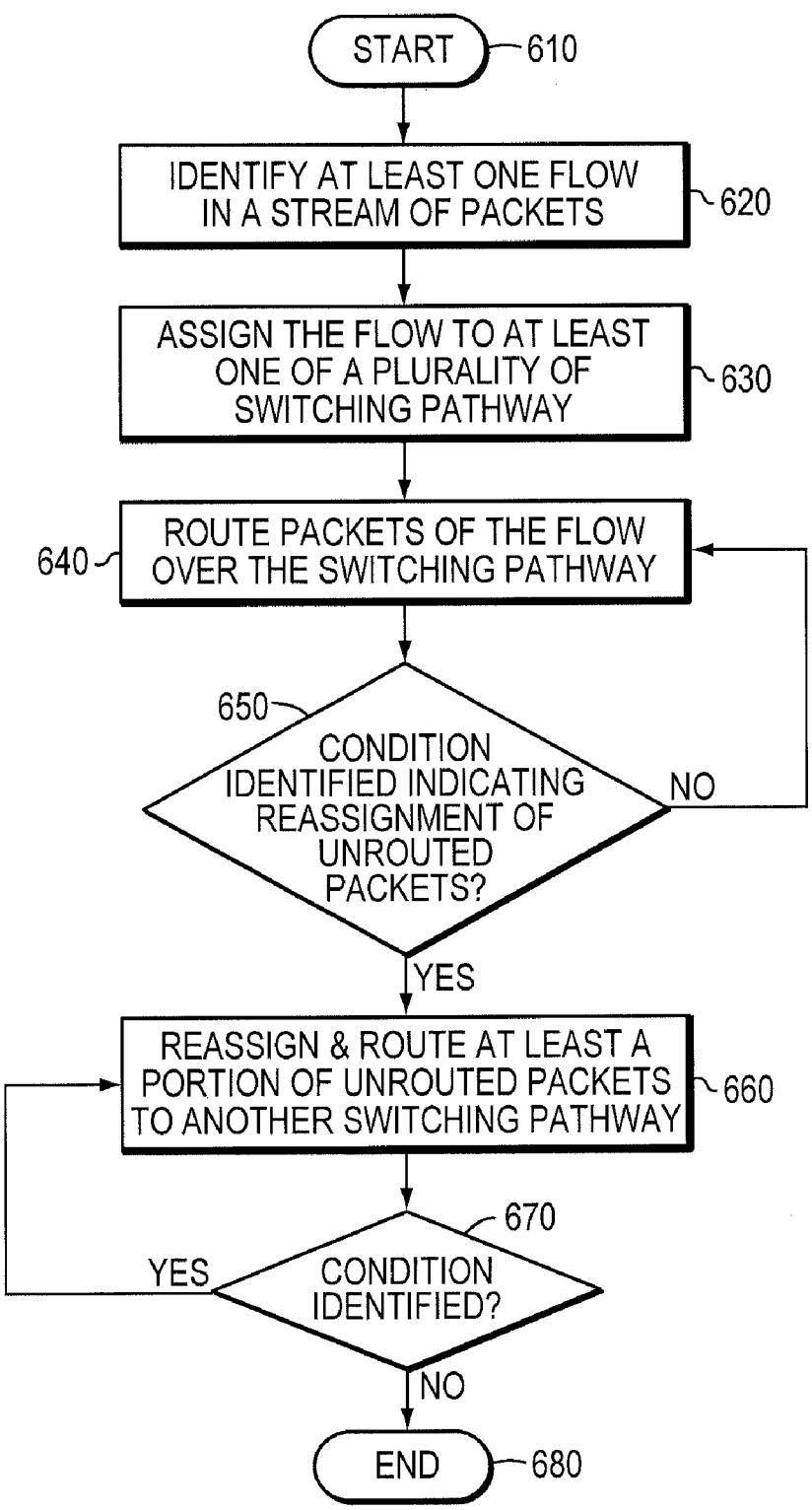
FIG. 6 is a flow diagram of a system for routing packets in accordance with an example embodiment of the present invention.

FIG. 6 is a flow diagram of an example system 600 for routing packets. The system 600 begins operation at 610. The controller 206 identifies at least one flow in a received stream of packets (620), and, the controller 206 assigns at least one flow to at least one of a plurality of switching pathways (630). A demultiplexor 204 routes packets of the flow over a switching pathway (640). The controller monitors the routing of the packets to identify a condition that indicates unrouted packets of the flow need to be reassigned to another switching pathway (650). If no condition is detected, the demultiplexor 204 continues to route packets of the flow to the assigned switching pathway. However, if a condition is detected, the controller 206 reassigns and the unrouted packets of the flow to a second switching pathway (660). The demultiplexor 204 routes the packets of the flow to the second switching pathway (660). The system continues to monitor the routing of packets over the second pathway for another condition that may warrant reassignment of the packets to another pathway (670). If a condition is detected, a portion of the flow diagram repeats (660, 670). The system ends once all packets have been routed (680).

It will be understood by the foregoing that a set of parallel switching systems that can switch data at a first rate can be employed to switch a stream of data at a much higher data rate if the higher-speed stream is appropriately split up and routed to the separate switching systems. While the inventive concept disclosed herein can be used with and is intended for use primarily with communications switching system that are used to route communications data, those of skill in the relevant art will appreciate that aspects of the present invention can also be used with more general purpose computers and computer systems.

In particular, the present invention could be used in the implementation of a high-speed parallel-processing "computer" having several lower-speed computers to which different computing tasks could be assigned. In this application for example, discrete computing tasks or data ordinarily performed or processed by one computer or processor can be assigned to individual computers or processors. Task distribution may include passing executable instructions (e.g. a program) to the computer to which a task would be assigned and having that machine assume responsibility for its completion. Such distribution may further include techniques for more effective administration of tasks or data. As that computer's ability to efficiently handle other tasks becomes too limited, for example, an administrative computer, or the computer itself, would reassign overloading tasks to other computers.

In another embodiment, wherein several computers process data using the same algorithm or procedure, such as numerically-intensive tasks, data can be sent to one computer for processing. As the computer reaches its computational limit, other data needing to be processed can be routed to other computers, including being re-routed from one computer to another.

Through the use of the apparatus and methods disclosed herein, lower-cost, higher-speed switching or other processing systems can be realized effectively using either custom devices or possibly lower-cost off-the-shelf components.

What is claimed is:

1. A method for routing packets, comprising:
   identifying at least one flow in a received stream of packets;
   assigning the at least one flow to at least a first one of a plurality of switching pathways;
   routing packets of the at least one flow over the first one of the plurality of switching pathways;
   identifying a condition, during the routing of the packets of the at least one flow, indicating reassignment of unrouted packets of the at least one flow;
   reassigning at least a portion of the unrouted packets of the at least one flow to a second one of the plurality of switching pathways in response to the condition; and
   routing the packets of the portion of the unrouted packets of the at least one flow over the second one of the plurality of switching pathways.

2. The method of claim 1, wherein the condition includes any one of periodically, congestion in the first one of the plurality of switching pathways, a rate of at least one flow into a buffer exceeds the rate from the buffer, a rate of at least one flow exceeds a predetermined rate, an aggregate rate of all identified flows into a buffer exceeds the aggregate rate of all identified flows from the buffer, a packet format error, a number of packets stored in a buffer exceeds a predetermined threshold, a buffer failure, a switch fabric failure, and unbalanced rates among the plurality of switching pathways.

3. The method of claim 1, wherein assigning the at least one flow includes assigning the at least one flow to a particular one of the plurality of switching pathways without regard to a rate of the at least one flow.

4. The method of claim 1, wherein assigning the at least one flow includes assigning the at least one flow to a particular one of the plurality of switching pathways having the smallest input rate.

5. The method of claim 4, wherein assigning the at least one flow includes assigning the at least one flow to the particular one of the plurality of switching pathways having a smallest queue length in response to more than one of the plurality of switching pathways having a same smallest input rate.

6. The method of claim 1, wherein identifying the at least one flow includes identifying the at least one flow according to at least a destination of a particular packet.

7. The method of claim 6, wherein identifying the at least one flow includes identifying the at least one flow according to a hash key of a source and destination of the particular packet.

8. The method of claim 7, further comprising indexing the hash key into a table of flows, the table including a time of arrival of a most recent packet and a switching path associated with each flow.

9. The method of claim 1, further comprising:
ensuring packets of the at least one flow are in order prior to routing.

10. The method of claim 9, further comprising:
estimating an amount of time for packets of the at least one flow to reach a predetermined point in the first one of the plurality of switching pathways;
delaying routing of the portion of the unrouted packets of the at least one flow over the second one of the plurality of switching pathways in response to the estimated time.

11. A system for routing packets, comprising:
means for identifying at least one flow in a received stream of packets;
means for assigning the at least one flow to at least a first one of a plurality of switching pathways;
means for routing packets of the at least one flow over the first one of the plurality of switching pathways;
means for identifying a condition, during routing of the packets of the at least one flow, indicating reassignment of unrouted packets of the at least one flow;
means for reassigning at least a portion of the unrouted packets of the at least one flow to a second one of the plurality of switching pathways in response to the condition; and
means for routing the packets of the unrouted packets of the portion of the at least one flow over the second one of the plurality of switching pathways.

12. The system of claim 11, further comprising:
means for ensuring packets of the at least one flow are in order prior to routing.

13. The system of claim 12, further comprising:
means for estimating an amount of time for packets of the at least one flow to reach a predetermined point in the first one of the plurality of switching pathways;
means for delaying routing of the portion of the unrouted packets of the at least one flow over the second one of the plurality of switching pathways in response to the estimated time.

14. The system of claim 11, further comprising:
means for assigning other flows to other ones of the plurality of switching pathways in response to assigning the portion of the at least one flow to the second one of the plurality of switching pathways.

15. The system of claim 11, further comprising:
means for tracking packet arrivals, routing of packets, input rates, aggregate input rates, historical flow rates, and packet size to facilitate switching pathway assignment.

16. A non-transitory computer readable medium including code for routing packets, the code, when executed by a processor, causes the processor to:
identify at least one flow in a received stream of packets;
assign the at least one flow to at least a first one of a plurality of switching pathways;
route packets of the at least one flow over the first one of the plurality of switching pathways;
identify a condition, during routing of the packets of the at least one flow, indicating reassignment of unrouted packets of the at least one flow;
reassign at least a portion of the unrouted packets of the at least one flow to a second one of the plurality of switching pathways in response to the condition; and
route the packets of the portion of the unrouted packets of the at least one flow over the second one of the plurality of switching pathways.

17. The non-transitory computer readable medium of claim 16, wherein the code, when executed by the processor, further causes the processor to:
ensure packets of the at least one flow are in order prior to routing.

18. The non-transitory computer readable medium of claim 17, wherein the code, when executed by the processor, further causes the processor to:
estimate an amount of time for packets of the at least one flow to reach a predetermined point in the first one of the plurality of switching pathways;
delay routing of the portion of the unrouted packets of the at least one flow over the second one of the plurality of switching pathways in response to the estimated time.

19. The non-transitory computer readable medium of claim 16, wherein the code, when executed by the processor, further causes the processor to:
assign other flows to other ones of the plurality of switching pathways in response to assigning the portion of the at least one flow to the second one of the plurality of switching pathways.

20. The non-transitory computer readable medium of claim 16, wherein the code, when executed by the processor, further causes the processor to:
track packet arrivals, routing of packets, input rates, aggregate input rates, historical flow rates, and packet size to facilitate switching pathway assignment.

21. A system for routing packets, comprising:
a demultiplexor operable to receive a stream of packets;
a plurality of switching pathways operable to route the packets; and
a controller operable to identify at least one flow in the stream of packets, the controller operable to assign the at least one flow to at least a first one of the plurality of switching pathways, the controller operable to identify a condition, during routing of packets of the at least one flow over the first one of the plurality of switching pathways, indicating reassignment of unrouted packets of the at least one flow, and the controller operable to reassign at least a portion of the unrouted packets of the at least one flow to a second one of the plurality of switching pathways in response to the condition.

22. The system of claim 21, wherein the controller is further operable to assign the at least one flow to a particular one of the plurality of switching pathways without regard to a rate of the flow.

23. The system of claim 21, wherein the controller is further operable to assign the at least one flow to a particular one of the plurality of switching pathways having the smallest input rate.

24. The system of claim 21, wherein the controller is further operable to ensure packets of the at least one flow are in order prior to routing.

25. The system of claim 24, wherein the controller is further operable to estimate an amount of time for packets of the at least one flow to reach a predetermined point in the first one of the plurality of switching pathways, the controller still further operable to delay the routing of the portion of the unrouted packets of the at least one flow over the second one of the plurality of switching pathways in response to the estimated time.

* * * * *